United States Patent [19]

Barathieu

[11] 4,307,848

[45] Dec. 29, 1981

[54] DEVICE FOR CONTROLLING THE TAKE-UP SPEED OF A WINDING FRAME

[75] Inventor: Andre Barathieu, Lyons, France

[73] Assignee: Rhone-Poulenc-Textile, Paris, France

[21] Appl. No.: 98,529

[22] Filed: Nov. 29, 1979

[30] Foreign Application Priority Data

Nov. 30, 1978 [FR] France ............................. 78 34300

[51] Int. Cl.³ ........................................... B65H 54/40
[52] U.S. Cl. ............................ 242/18 R; 242/18 DD; 242/45
[58] Field of Search ................ 242/18 R, 18 DD, 45

[56] References Cited

U.S. PATENT DOCUMENTS

| | | | |
|---|---|---|---|
| 2,950,067 | 8/1960 | Keith | 242/18 DD |
| 3,288,383 | 11/1966 | Muller | 242/45 |
| 3,825,206 | 7/1974 | Schippers et al. | 242/18 DD |
| 4,043,517 | 8/1977 | Jahrig | 242/18 DD |
| 4,069,985 | 1/1978 | Lohest et al. | 242/45 |
| 4,203,560 | 5/1980 | Isoard | 242/45 |

FOREIGN PATENT DOCUMENTS

51-92334  8/1976  Japan .............................. 242/45

Primary Examiner—Stanley N. Gilreath

[57] ABSTRACT

The invention relates to a device for controlling the take-up speed of a winding frame for textile yarns, which winding frame has peripheral drive by means of a pilot roller and axial drive by means of a gas turbine integral with the spindle which carries the winding. The device acts when the winding is out of contact with the pilot roller.

The control device includes:
  a calculating unit which, using pulses originating from the pilot roller, emits pulses at a required frequency of the spindle, and
  a frequency comparator which compares the frequency of pulses originating from the rotating spindle with the required frequency, and which, from the comparison, controls a device for regulating the fluid supply of the turbine.

Several winding frames can be simultaneously controlled. The device can be used to provide the spindle with an overspeed at the start of winding, in order to avoid drops in tension.

12 Claims, 7 Drawing Figures

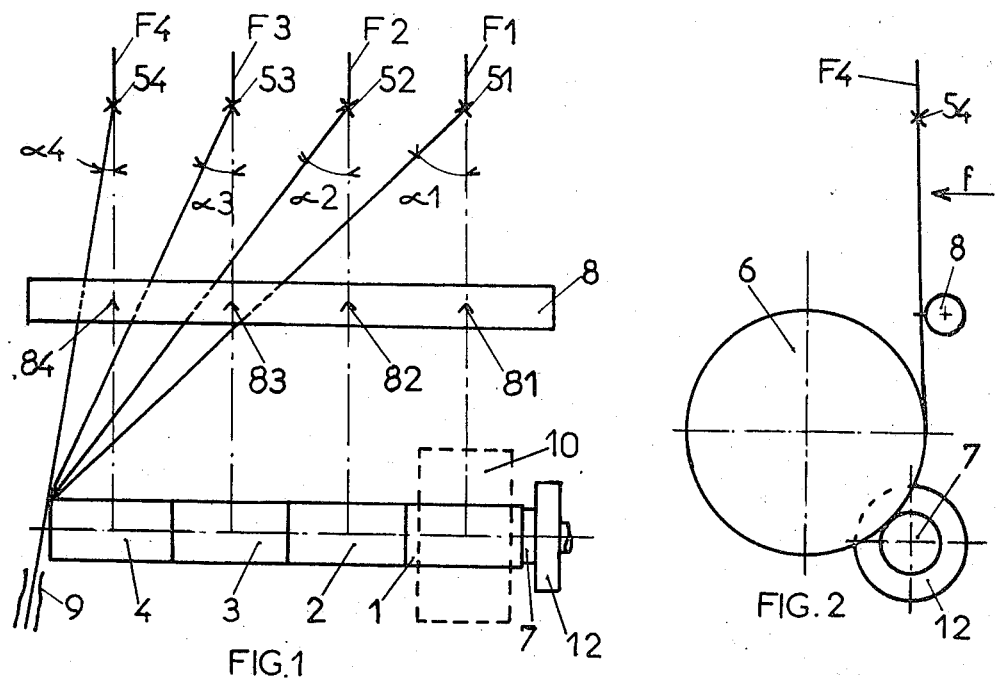
FIG. 1
FIG. 2
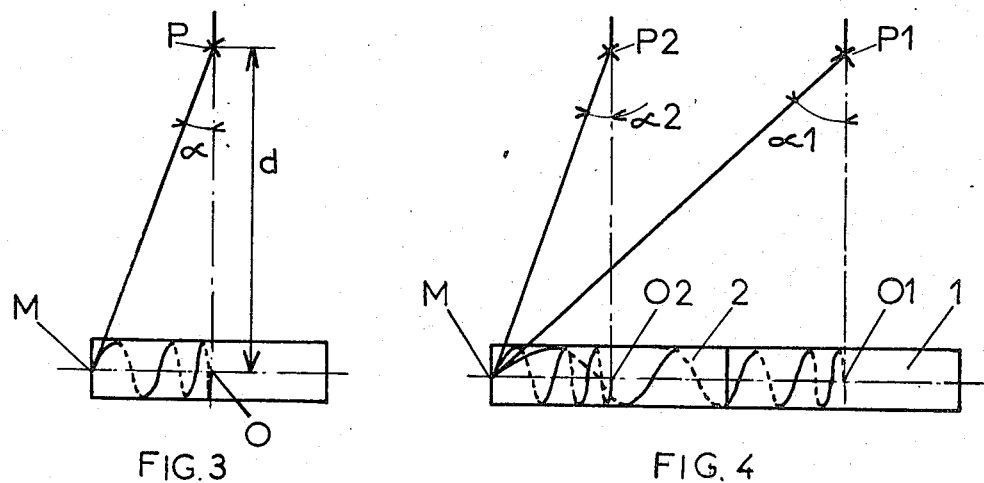
FIG. 3
FIG. 4
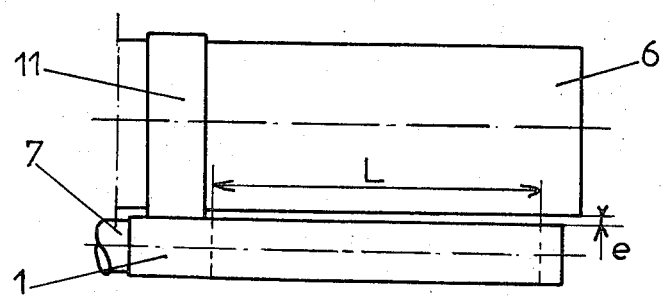
FIG. 5
PRIOR ART

DEVICE FOR CONTROLLING THE TAKE-UP SPEED OF A WINDING FRAME

The present invention relates to a device for controlling the take-up speed of at least one winding frame for textile yarns.

A type of winding frame referred to as a winding frame "with double drive" is commonly used in the synthetic fibers industry and has the following components:

a spindle for gripping one or more winding supports, a device for distributing the yarns in a reciprocating fashion along the spindle, which device is equipped with at least as many traverse guides as there are windings to be produced, triangulation guides corresponding to the traverse guides, which triangulation guides are located upstream of the latter in the median plane to the stroke of each traverse guide, a pilot roller in peripheral contact with the windings, the function of which pilot roller is to fix the peripheral speed of the windings, while at the same time optionally providing part of the torque required to drive them, and axial drive means for the spindle, which consist of a slip motor, such as a gas turbine, providing all or part of the torque required for driving.

On this type of winding frame, when the winding support (tube) or the winding is in contact with the pilot roller, the rotation speed of the spindle, and hence of the turbine, is determined by that of the pilot roller.

However, in the starting stage for example, when the tube is not yet in contact with the pilot roller, only the turbine drives the spindle. The turbine can be used to give the spindle a defined speed, for example, an overspeed which assists the attachment of the yarn or yarns. It is then necessary to control the speed of the turbine.

It is known to control the speed of a turbine by varying the flow rate of the fluid supply using a flow restrictor. The latter can be controlled, for example, either mechanically by means of a system which is sensitive to the enlargement of the winding (French Pat. No. 1,238,700), or pneumatically from a device for controlling the tension of the yarn (Russian Pat. No. 303,791).

However, the above devices involve the control of the speed of a single winding frame. For a set of winding frames, there must be as many control devices as there are winding frames, and it is thus impossible to have absolutely identical running conditions on all the winding frames in the set. Moreover, the precision of the control, in particular in the case of the mechanical device, cannot be very high.

French Pat. No. 2,054,754 to Schlumberger describes a device for equalizing the speed of a growing bobbin (as the yarn winding diameter increases) with the speed of a feeding roller, each of which is driven by an electric motor. The devices used includes a comparator for receiving two input signals—one from the bobbin, the other from the roller. In response to the signals the comparator emits an output signal which acts on a rectifier circuit for controlling the speeds.

The present invention proposes a new device for controlling the speed of a turbine associated with at least one winding frame with double drive and advantageously of several such turbines associated with several such winding frames simultaneously.

SUMMARY OF THE INVENTION

The present invention provides a device for controlling the take-up speed of at least one winding frame with double drive, for winding textile yarns, the winding frame including at least one spindle for gripping at least one winding support, a pilot roller for the peripheral drive of the winding, and a gas turbine, integral with the spindle, for axial drive. The control device controls the speed of the turbine, using the speed of the pilot roller as a reference, the control being accomplished by causing a variation in the flow rate in the supply circuit of the turbine when the winding tube or the winding is out of contact with the pilot roller. The control device includes, in combination:

a device for emitting pulses at a frequency corresponding to the angular speed of the pilot roller, a calculating unit which receives the pulses from the emitter and itself emits pulses at a required frequency for the spindle, corresponding to the desired take-up speed, after two coefficients have been fed in, the first being a function of the geometry of the winding frame (diameter of the pilot roller and diameter of the tube) and the second being the ratio of the desired take-up speed to the peripheral speed of the pilot roller, a device for emitting pulses at a frequency corresponding to the angular speed of the spindle, and a frequency comparator which receives the pulses on the one hand from the calculating unit and on the other hand from the emitter associated with the spindle frequency, performs the comparison and, from this comparison, controls a system for regulating the fluid supply to the turbine.

The control device according to the invention can be produced using electronic logic or pneumatic logic, the latter being more especially suitable for winding frames with a low winding speed which is on the order of a few hundred meters per minute. Preferably, the device is produced using electronic logic.

Advantageously, in a known manner, the pilot roller is driven by a synchronous electric motor or itself consists of a synchronous axial motor. Its speed is therefore a function of the frequency of the electricity supply. Supplying electricity at a given frequency is achieved using a frequency converter, for example, a static converter, such as a thyratron inverter, or a rotary converter, that is to say a rotating converter set. The converter simultaneously feeds a series of identical winding frames, for example, all the winding frames of a loom which are to function with the same parameters (same geometry and same take-up speed). The frequency tapped off between two phases at the converter output is taken as the emitter of signals (pulses) sent to the calculating unit.

The calculating unit consists of a frequency multiplier and divider which permits very high precision, taking account of the coefficients fed in. It functions with any waveforms emitted by the converter, including the "chopped" forms, with the optional interposition of a filter at the input. The multiplier and divider emits pulses at a required frequency which is valid for the whole set of winding frames functioning with the same parameters. There is a single multiplier and divider for this set of winding frames. It determines the frequency of the pulses which the spindle must emit in order for the peripheral speed of the tube carried by the spindle to be equal to the desired speed, taking into account, on the one hand, of the first coefficient K, which is a function of the diameter of the pilot roller and of the diameter of the winding tube, and, on the other hand, of the second coefficient K', which corresponds to the desired level of overspeed or underspeed. It thus emits pulses at this calculated required frequency with a precision which can be very high, namely on the order of $10^{-3}$ Hertz if necessary. The pulses at the required frequency are sent to a frequency comparator, which is advantageously a frequency and phase comparator in the case of electronic logic. There is one comparator per spindle on the winding frame. It also receives the signals emitted from a sensor of the spindle speed, the signals being emitted at the frequency corresponding to the rotation of the spindle and of the turbine which is integral therewith, The comparator performs a comparison of frequencies, and if appropriate of phases, between the signals emitted by the sensor of the spindle speed and the required signals and, from this, emits a signal for controlling a system which regulates the fluid supply of the turbine. The regulating system can either be continuous and progressive or it can function as a regulator which is either open or closed, or wholly or partially open, depending on the desired fineness of the regulation.

The coefficient of overspeed or underspeed, which can be applied by the device according to the invention, can vary within wide limits, namely from a few fractions of a percent of the initial speed to several times the latter. In the case where the device is used to control an overspeed when winding is started, in order to avoid yarn breakages, it can be actuated as soon as the winding frame is started, and it can be stopped approximately at the instant when the winding support is brought into contact with the pilot roller.

However, the invention will be understood more clearly with the aid of a constructional and illustrative embodiment which is given by way of illustration but without implying a limitation.

FIGS. 1 and 2 schematically represent a winding frame with double drive, FIG. 2 is an end view and FIG. 1 is a front view along the arrow f.

FIGS. 3 and 4 illustrate the starting of windings.

FIG. 5 shows a known construction for providing the starting of a winding with an overspeed.

Figure 6:
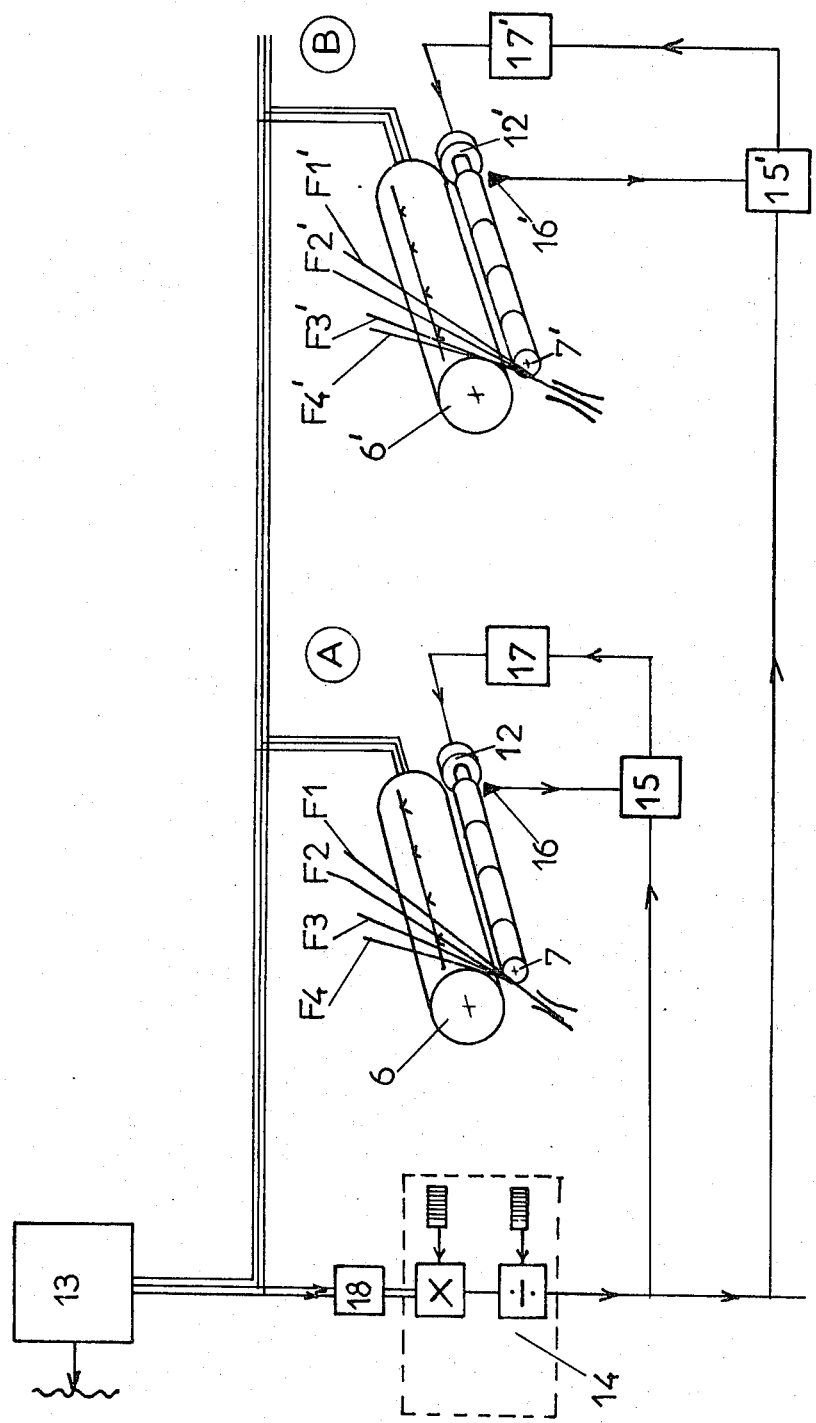
FIG. 6 shows a schematic diagram of the device according to the invention in one embodiment.

The example relates to the application of the device according to the invention to the simultaneous starting of several windings side by side on a spindle of the winding frame, for the purpose of providing the spindle with an overspeed.

The winding frame with double drive, shown in FIGS. 1 and 2 includes:

a spindle 7, which in this case carries four winding support-tubes 1, 2, 3 and 4 and is axially driven by means of a gas tubine 12, a pilot roller 6 (shown only in FIG. 2), which is in peripheral contact firstly with the tubes 1, 2, 3 and 4 and then with the windings, such as 10, and the function of which is to fix the peripheral speed of the said windings, a device 8 for distributing the yarns in a reciprocating fashion, which device is equipped with as many yarn guides 81, 82, 83 and 84 as there are yarns to be wound, and fixed triangulation guides 51, 52, 53 and 54, which are located in the median plane to the stroke of each traverse guide.

On this type of winding frame, the four windings are started simultaneously. With the yarns passing through the triangulation guides, the windings are started, when the yarns are first fed through, by the simultaneous attachment of the yarns to the end of the spindle or to the end tube 4 with the aid of a manipulation gun 9 (which carries the yarns along and runs them to waste). After attachment, the yarns, which are kept out of reach of the traverse guides, slide laterally under the influence of the return forces and take up a position on their respective winding zones, at right-angles to their triangulation guides.

In the attachment position, the yarns follow different paths as from the triangulation guides and these paths meet at a single point at the level of the gun 9. The paths are deflected to a greater or lesser extent, relative to the trajectory normal to the spindle. In practice, in the case of the most deflected yarns, it is observed that, if the angle of deflection alpha ($\alpha$) is greater than about 15°, there is a large drop in tension after attachment, and this causes breakage of the yarn, due to whipping back, on the delivery rollers which are located upstream and deliver the yarn at constant speed. This disadvantageous phenomenon which is directly related to the deflection of the yarns is illustrated in FIGS. 3 and 4.

At the level of the transitional stage of initial feeding, immediately after attachment, the end M of the yarn arriving on the spindle 7 moves from the point of attachment to the middle (0, 01, 02) of the winding zone, thus describing a helix of variable and decreasing pitch. The length of yarn thus wound is greater than that which would have been wound if the trajectory had remained fixed and normal to the spindle. There is a gain in the length of yarn wound, which gain is directly proportional to the initial angle of deflection $\alpha$.

On the other hand, during the same period, the change from the deflected path (PM, P2M, P1M) to the path normal to the spindle (P0, P101, P202) releases excess yarn (change from the hypotenuse to a side of the right-angle triangle). This excess yarn is proportional to the angle of deflection $\alpha$. Calculation shows that this excess of yarn delivered, which results in a loss in the length of yarn wound, is greater than the above gain.

For small angles of deflection, which in practice are less than 15°, such as $\alpha 2$, the difference between loss and gain remains small and is of no consequence. This is all the more true because, for the purpose of enabling the yarn to wind onto the spindle rather than onto the pilot roller, the spindle is always provided, when the yarns are first fed through, with an overspeed of the order of 1%, relative to the delivery speed of the yarn, which in principle is equal to the speed of the pilot roller. On the other hand, if the angle $\alpha$ is large (for example the angle $\alpha 1$, FIG. 4), the difference between loss and gain becomes large and, even with an overspeed of the order of 1%, the loss in the length of yarn wound causes a drop in tension which leads to breakage of the yarn and whipping back.

This phenomenon is found with all yarns. Even in the case of yarns having a fairly low modulus of elasticity, the small pretensions provided by the manipulation gun 9 do not make it possible to build up sufficient lengthening to prevent the tension from falling below the critical whipping-back value, which is a function of the gauge of the yarn and the delivery speed.

It is, therefore, necessary to provide the yarns with an overspeed on starting. It is known to provide the spindle with an overspeed of the order of 1% by means of a starter ring 11 shown in FIG. 5. This is part of the pilot roller and has a slightly larger diameter than the body of the pilot roller 6. The ring remains in contact with the tube 1 throughout the time take by the yarn to fill the space e. If the diameter of the starter ring is increased so as to give an overspeed of the order of 10 to 15%, which ensures with certainty that initial feeding will take place without breakage of the yarn due to whipping back, difficulties are encountered. In fact, the overspeed does indeed provide the desired overtension, but it increases as the newly formed winding becomes larger (up to contact between the pilot roller and the winding), causing the overtension to increase accordingly. To this increasing overtension must be added the overtension created by the displacement of the traverse guide. It is thus found that the first layers of yarn are wound with a very high tension and that they cause a binding effect on the winding tube. Since the latter is generally made of a flexible material, such as cardboard or plastic, it is subjected to deformations and crushing and can no longer be removed from the spindle when the winding is complete. Moreover, in the case of synthetic yarns with partial molecular orientation (semi-drawn yarns), the application of high tensions causes a modification in the structure of these yarns, which results in defects during subsequent treatments, such as dyeing. The use of a starter ring is therefore unacceptable.

The device according to the invention makes it possible to solve the problem.

One non-limiting embodiment, based on electronic logic, is represented schematically in FIG. 6.

This figure shows two winding frames A and B of a set of identical winding frames functioning with the same parameters, the components associated with winding frame B being designated by the symbol ('). The pilot rollers 6, 6', the spindles 7, 7', the turbines 12, 12' for driving the spindle, and four yarns F1, F2, F3 and F4, and F1', F2', F3' and F4' represented schematically in the attachment position, are shown on each winding frame. The pilot rollers (synchronous axial motor) are fed by a static frequency converter 13. The frequency signals originating from the converter 13 are sent, after filtering at 18, to a frequency multiplier and divider 14 into which the coefficient K, which is a function of the geometry of the winding frames, and the coefficient K', which is a function of the desired overspeed, are fed. The device 14 emits a required signal for the spindles 7, 7', which corresponds to the desired speed of the latter. The required signal, which is the same for all the spindles, enters a phase and frequency comparator 15, 15', which also receives a signal originating from a sensor 16, 16' of the spindle speed, the frequency of which latter signal corresponds to the rotation speed of the spindle. There is one phase and frequency comparator per spindle. The comparator emits a signal which controls a system 17, 17' for regulating the motive fluid supply of the turbine 12, 12'.

According to a non-limiting embodiment, the fluid supply of the turbine includes a supply circuit at high pressure (for example, 9 bars) and a supply circuit at low pressure (for example, 4 bars), each circuit being controlled by an electro-valve, and the two electro-valves, functioning as valves which are either open or closed, being controlled by the comparator 15, 15'.

In normal operation, that is to say when the tube or the winding is in contact with the pilot roller, the turbine is supplied by the low-pressure circuit. This supply alone, before contact with the pilot roller takes place, communicates, to the turbine, an angular speed which is such that the peripheral speed of the tube carried by the spindle is slightly greater than the required winding speed. After contact, the pilot roller then acts as a brake for the spindle. Advantageously, the low-pressure supply is equipped with a fluid-saving system such as shown in French patent application No. 76/01,767, flied in the name of the applicant company, Rhone Poulenc Textile, corresponding to U.S. Pat. No. 4,203,560, economiser having the effect of gradually reducing the supply pressure to the value zero, which is reached before the end of the winding cycle.

When the winding is started, with the pilot roller and the tubes not being in contact, the control device is actuated and the comparator 15, 15' controls the opening of the electro-valve in the high-pressure circuit. The rotation speed increases very rapidly. On changing to the desired speed (the calculated frequency and the frequency measured on the spindle being equal), the control device triggers the closing of the electro-valve. However, by virtue of inertia, the speed continues to increase slightly, rapidly reaches a peak and then drops again. If it drops below the desired value, the control device reacts and triggers the opening of the electro-valve in the low-pressure circuit. The speed increases and, when it reaches the required speed, the control device triggers the closing of the electro-valve. The latter opens and closes continuously. The speed fluctuates within a range of less then 1%, relative to the required value. This precision is more than adequate for the present application. For other uses, much greater precision can be achieved by employing a system for regulating the supply of the turbine, which system comprises more than two electro-valves, or a regulating system of the continuous type.

The deactuation of the control device is governed by the manual or automatic control which triggers the bringing of the tubes into contact with the pilot roller, this bringing into contact taking place immediately after the yarns have been seized by the traverse guides.

Figure 7:
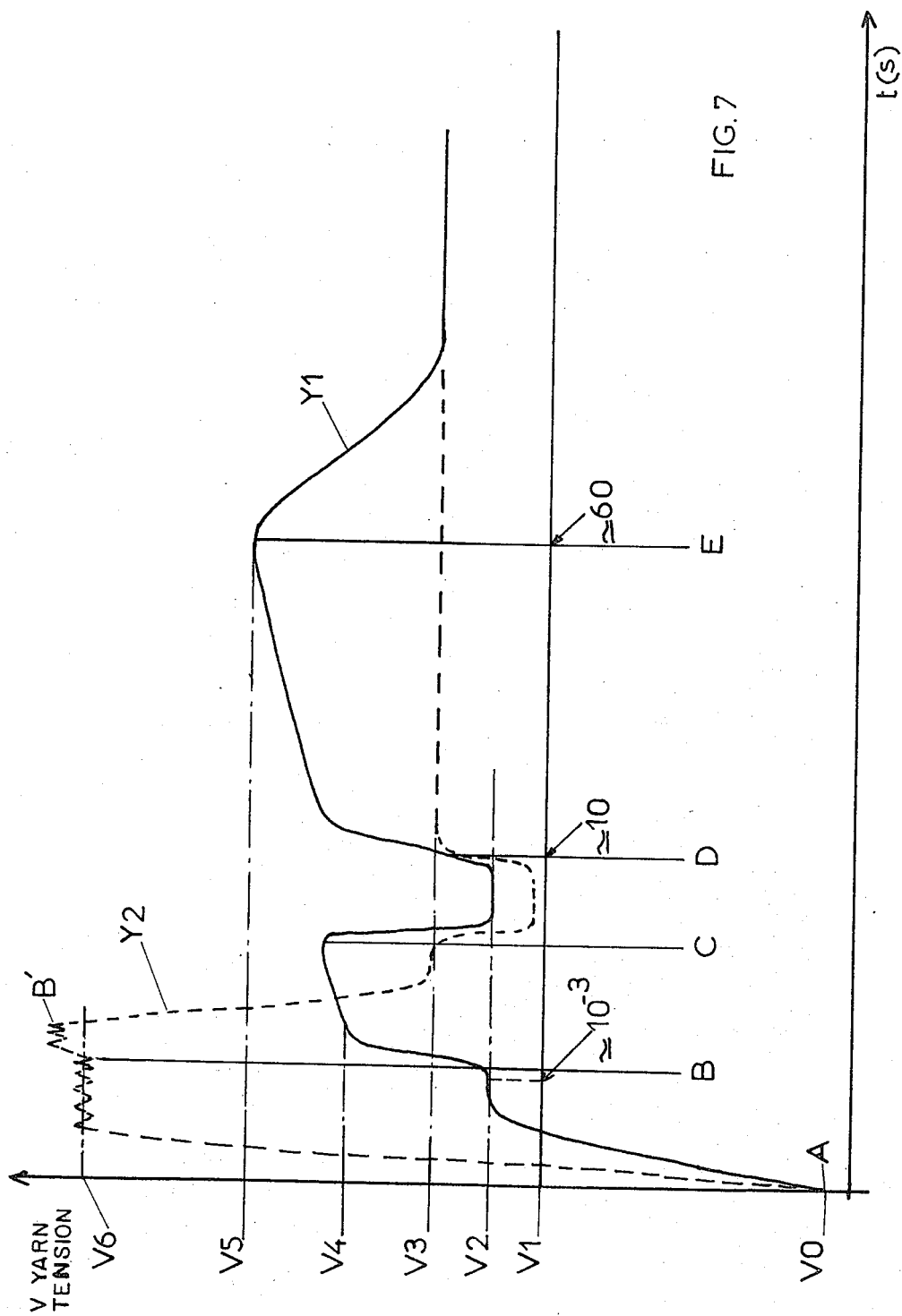
FIG. 7 is a graph demonstrating the advantages of the device according to the invention.

FIG. 7 is a graph showing the general form of the change in the winding speed (and hence, the tension of the yarn, which is proportional thereto) as a function of time, respectively with an initial feeding method which would use the conventional starter ring and with the method which employs the device according to the invention. Winding is carried out at a high speed of the order of 5,000 meters/minute, with pilot roller speeds of the order of 10,000 to 12,000 rpm and spindle speeds of the order of 17,000 to 23,000 rpm.

In both cases, the winding process involves the formation of a transfer tail; in accordance with this process, the yarn, after attachment, is first seized by its normal traverse guide, is subsequently taken out of contact with this guide in order to form the transfer tail, and is then taken up again by this guide after formation of the transfer tail.

The speed curve Y1 according to the method using a starter ring is shown in a continuous line, and the curve Y2 according to the method using the device according to the invention is shown in dotted lines. A represents the point of attachment, B represents the seizing of the yarn by the normal traverse guide, C represents the point at which the yarn is taken out of the traverse guide in order to form the transfer tail during the interval CD, and D is the point at which the yarn is taken up by the normal traverse guide when the transfer tail is complete. The points A, B, C and D are common to both methods.

In accordance with the method using a starter ring, the overspeed of the spindle 7 is achieved by means of a starter ring 11 (FIG. 5), and it is necessary to fill the gap e before obtaining contact between the winding and the pilot roller. Contact takes place at the point E after a winding period of the order of about one minute. $V_0$ is the speed of the yarn at the moment of attachment, $V_1$ is the normal peripheral speed of the pilot roller, $V_2$ is the speed of the spindle on attachment (starter ring), and $V_3$ is the mean take-up speed of the yarn during normal winding, taking account of its passage through the moving traverse guide, $V_4$ is the take-up speed of the yarn when the spindle is being driven by the starter ring and when the yarn is passing through the moving traverse guide, and $V_5$ is the winding speed at the moment when the winding comes into contact with the pilot roller, that is to say when the space e has been filled.

Examination of the curve Y1 shows that the speed $V_5$ is much higher than the speed $V_2$. If $V_2$ is given a value which is of the order of 10 to 15% greater than the required speed $V_1$, so as to have adequate tensions for the four yarns on attachment, $V_5$ assumes a very high value. The layers of yarn wound between D and E, with a high tension, cause a significant binding effect which results in the crushing of the support tube and prevents it from being removed from the spindle.

According to the invention (curve Y2), the spindle is provided, between A and B, with a high speed $V_6$ which also gives the yarn a high tension. There is no longer a drop in tension in the case of the most deflected yarns (F1 and F2) and attachment takes place normally. This overspeed is achieved by greatly increasing the pressure of the fluid supply of the turbine and then controlling the supply by means of the low-pressure circuit. Subsequently, when the tube has been brought back into contact with the pilot roller (point B'), the winding speed falls, the transfer tail is formed and the speed then assumes the value $V_3$ when the yarn is taken over by the traverse guide. The increase in the tension between D and E and the high value of the tension at the point E are eliminated. The winding support-tubes are no longer subjected to the binding effect and can be removed from the spindle 7 normally.

The control device according to the invention exhibits numerous advantages:

It is universal. In fact, it can be adapted to suit any geometry of winding frame by simply feeding the parameters of the winding frame (coefficient K) into the frequency multiplier and divider 14.

It functions with any waveforms produced by a frequency converter, with the optional addition of a filter at the input of the frequency multiplier and divider.

It makes it possible to feed in any level of overspeed or underspeed (coefficient K').

Once the level K' has been fed in, the device automatically follows the changes in the speed of the pilot roller. The change in the required take-up speed of the yarn does not make it necessary to feed in new required speed instructions.

It makes it possible to control an unlimited number of spindles and winding frames functioning with the same parameters.

Of course, the invention is not restricted to the embodiment and the application which have been described.

In the application described, as already pointed out, the embodiment can include variants, in particular as regards the system for regulating the fluid supply to the turbine, it also being possible for the system to be of the continuous type.

The device can be constructed using pneumatic means in place of the electronic means.

By making certain alterations, it can be used in other application, for example, in order to give an overspeed to a winding which has just been brought out of contact with the pilot roller at the end of winding, just before storage.

In general terms, the invention applies to the winding of yarns of any nature, of any type and of any gauge.

It applies in particular to the winding of synthetic yarns at a high speed of 5,000 to 7,000 meters/minute or above, and the winding frames equipped with long spindles on which several windings are formed side by side.

What is claimed is:

1. A control device for controlling the take-up speed of at least one winding frame with double drive, for winding textile yarns, the winding frame including at least one spindle for gripping at least one winding support, a pilot roller for the peripheral drive of the winding, and a gas turbine, integral with the spindle, for axial drive, said control device operating on the turbine, using the speed of the pilot roller as the reference, and governing a variation in the flow rate in the supply circuit of the turbine when the winding tube or the winding is out of contact with the pilot roller, said control device comprising:

a first pulse emitting device for emitting pulses at a frequency corresponding to the angular speed of said pilot roller, a calculating unit which receives the pulses from the emitter and itself emits pulses at a required frequency of the spindle, corresponding to the desired take-up speed, after two coefficients have been fed in, namely a first coefficient which is a function of the geometry of the winding frame (diameter of the pilot roller and diameter of the winding support), and a second coefficient which represents the ratio of the desired take-up speed to the peripheral speed of the pilot roller, a second pulse emitting device for emitting pulses at a frequency corresponding to the angular speed of the spindle, and a frequency comparator which receives the pulses on the one hand from the calculating unit and on the other hand from the emitter associated with the spindle, performs the comparison and, from this comparison, controls a system for regulating the fluid supply of the turbine.

2. The control device according to claim 1, for controlling the take-up speed of a series of winding frames having the same geometries and functioning with the same parameters, wherein said control device comprises a single calculating unit, which emits a unique required signal for all the winding frames, a device for emitting pulses at the spindle frequency, and a frequency comparator for each spindle of each winding frame.

3. The control device according to any one of claims 1 or 2, wherein the pilot rollers are each driven by a synchronous motor, said device further comprising a single frequency converter for feeding each motor and wherein the frequency between phases of the voltage at the converter outlet constitutes the emitter of pulses at the frequency corresponding to the angular speed of the pilot roller.

4. The control device according to any one of claims 1 or 2, wherein the first pulse emitter device comprises a frequency converter which is a static converter.

5. The control device according to any one of claims 1 or 2, wherein the first pulse emitter device comprises a frequency converter which is a rotary converter.

6. The control device according to any one of claims 1 or 2, wherein the system for regulating the fluid supply of the turbine is a progressive continuous system.

7. The control device according to any one of claims 1 or 2, wherein the system for regulating the fluid supply of the turbine is a system of the type which is either open or closed, or wholly or partially open.

8. The control device according to any one of claims 1 or 2, wherein the calculating unit comprises a frequency multiplier and divider which is capable of receiving any shape of waveform originating from the first pulse emitter device.

9. The control device according to claim 8 wherein the calculating unit further comprises a frequency filter between the first pulse emitter device and the frequency multiplier and divider.

10. The control device according to any one of claim 1 or 2 wherein said first and second pulse emitters, calculating unit and frequency comparator are each pneumatically operated.

11. The control device according to any one of claims 1 or 2 wherein said first and second pulse emitters, calculating unit and frequency comparator are each electronically operated.

12. The control device according to claim 11 wherein the frequency comparator is a frequency and phase comparator.

* * * * *